US010706726B2

(12) United States Patent
Ramachandra et al.

(10) Patent No.: US 10,706,726 B2
(45) Date of Patent: Jul. 7, 2020

(54) MULTIPLE FLIGHT DATA REFERENCE FOR A SPECIFIC SELECTION ON A VERTICAL AND LATERAL DISPLAY

(71) Applicant: HONEYWELL INTERNATIONAL INC., Morris Plains, NJ (US)

(72) Inventors: Sripathi Ramachandra, Karnataka (IN); Mark Pearson, Peoria, AZ (US); Greg Carlucci, Phoenix, AZ (US); Richard Snyder, Phoenix, AZ (US); Balaji Srinivasan, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 92 days.

(21) Appl. No.: 15/912,942

(22) Filed: Mar. 6, 2018

(65) Prior Publication Data
US 2019/0279514 A1    Sep. 12, 2019

(51) Int. Cl.
*G08G 5/00* (2006.01)
*G01C 23/00* (2006.01)

(52) U.S. Cl.
CPC .......... *G08G 5/0021* (2013.01); *G01C 23/00* (2013.01); *G01C 23/005* (2013.01); *G08G 5/003* (2013.01); *G08G 5/0039* (2013.01); *G08G 5/0052* (2013.01); *G08G 5/0078* (2013.01)

(58) Field of Classification Search
CPC .................................................. G08G 5/0021
See application file for complete search history.

(56) References Cited

U.S. PATENT DOCUMENTS

| 6,112,141 | A  | * | 8/2000  | Briffe ...................... G01C 23/00 345/1.3 |
|-----------|----|---|---------|---------------------------|
| 7,212,216 | B2 |   | 5/2007  | He et al.                 |
| 7,765,061 | B1 |   | 7/2010  | Matsumoto                 |
| 7,783,393 | B2 |   | 8/2010  | Tucker et al.             |
| 8,099,201 | B1 |   | 1/2012  | Barber et al.             |
| 8,285,427 | B2 |   | 10/2012 | Rogers et al.             |
| 8,843,250 | B2 |   | 9/2014  | Tucker et al.             |
| 9,583,010 | B1 | * | 2/2017  | Kolek .................. G08G 5/0065 |
| 9,702,726 | B2 |   | 7/2017  | Turner et al.             |

(Continued)

FOREIGN PATENT DOCUMENTS

| EP | 2362289 A2 | 8/2011  |
|----|------------|---------|
| EP | 3109725 A1 | 12/2016 |

*Primary Examiner* — Alex C Dunn
(74) *Attorney, Agent, or Firm* — Lorenz & Kopf, LLP (57) ABSTRACT

Methods and systems for a flight display system are provided. The method includes: commanding a vertical situation display (VSD) and a lateral navigation display (ND) to render, concurrently, a viewing segment of a flight plan. The method includes receiving a user input selecting a section of the viewing segment, the user input being received on only one of the VSD and the ND. The method continues by commanding, concurrently, the VSD and the ND to visually distinguish the section, and to demark the section on the VSD with starting points and ending points. The method identifies a flight parameter, and for the flight parameter, includes (a) determining which display, among the VSD and the ND, is appropriate for the rendering of flight parameter information; (b) generating flight parameter information based on (a); and (c) overlaying the flight parameter information on the appropriate display.

12 Claims, 6 Drawing Sheets

(56) References Cited

U.S. PATENT DOCUMENTS

| | | | |
|---|---|---|---|
| 9,709,420 B2 | 7/2017 | Bonamy et al. | |
| 2003/0193410 A1* | 10/2003 | Chen | G01C 23/005 340/971 |
| 2005/0231390 A1* | 10/2005 | Crane | G01C 23/005 340/945 |
| 2006/0004496 A1 | 1/2006 | Tucker et al. | |
| 2010/0305783 A1 | 12/2010 | Tucker et al. | |
| 2010/0332123 A1 | 12/2010 | Filias et al. | |
| 2011/0208374 A1 | 8/2011 | Jayathirtha et al. | |
| 2013/0013133 A1* | 1/2013 | Walter | G08G 5/0021 701/11 |
| 2014/0336921 A1* | 11/2014 | Schulte | G01C 23/005 701/409 |
| 2014/0365041 A1* | 12/2014 | Deker | G05D 1/0607 701/4 |
| 2015/0123912 A1* | 5/2015 | Nikolic | B64D 43/00 345/173 |
| 2016/0078770 A1* | 3/2016 | Coulmeau | G08G 5/0039 701/3 |
| 2017/0032576 A1 | 2/2017 | Mazoyer et al. | |
| 2017/0076611 A1* | 3/2017 | Shamasundar | G08G 5/0013 |
| 2017/0124734 A1* | 5/2017 | Gowda | G06T 11/20 |
| 2017/0168658 A1* | 6/2017 | Lacko | G01C 23/005 |
| 2018/0233056 A1* | 8/2018 | Liberman | G08G 5/025 |
| 2018/0238996 A1* | 8/2018 | Gurusamy | G01S 7/24 |
| 2018/0292661 A1* | 10/2018 | Songa | G06T 11/60 |

* cited by examiner

MULTIPLE FLIGHT DATA REFERENCE FOR A SPECIFIC SELECTION ON A VERTICAL AND LATERAL DISPLAY

TECHNICAL FIELD

The present invention generally relates to mobile platform display systems, and more particularly relates to methods and systems that generate multiple flight data references for a specific selected section on a vertical and lateral display.

BACKGROUND

When a user, such as a pilot or other stakeholder, wants to study a complete flight, or portion thereof, they often rely on a vertical situation display (VSD) and/or a lateral navigation display (ND). In many situations, the user wishes to specifically analyze or optimize a specific section of a flight plan.

Sometimes the user wishes to analyze multiple flight data (or specific flight parameters) along the selected section, but this flight data is either not available, or is not displayed in a useful manner. To achieve the desired analysis, the user may have to spend additional time visually mapping a portion of the flight plan on the VSD and then finding corresponding information on the ND. In many instances, this exercise requires navigating through multiple modes and window range sizes, which adds to head down time and increases cognitive demand.

Accordingly, improved flight display systems and methods are desirable. Desired display systems and methods respond to user selections of a section of a flight plan, those user selections being made on either the VSD or the ND. The desired display systems and methods provide multiple specific flight data (i.e., flight parameter information) for the selected section. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight display system for an aircraft is provided. The flight display system comprises: a display system configured to render thereon a viewing segment defined as at least a portion of a flight plan for the aircraft, the viewing segment, when rendered, being concurrently presented on (i) a vertical situation display (VSD), and (ii) a lateral navigation display (ND); and a control module comprising a processor and a memory, the control module operationally coupled to the display system and configured to, receive a user input that selects a section of the viewing segment, the user input being received on a first display, the first display being one of the VSD and the ND; visually distinguish the section from the remaining portion of the viewing segment on the VSD and the ND; visually demark a starting point of the section and an ending point of the section on (i) an X axis and (ii) a Y axis, of the VSD; generate a flight parameters window based on the starting point of the section and the ending point of the section, the flight parameters window including, for a first flight parameter: an alphanumeric value at the starting point of the section, a graphical representation of a rate of change between the starting point of the section and the ending point of the section, and an alphanumeric value at the ending point of the section; command the display system to overlay, on the VSD, the flight parameters window; obtain current aircraft status data; and concurrently update the VSD, the ND, and the flight parameters window based on continuously obtaining the current status information for the aircraft.

Also provided is a method for a flight display system, comprising: at a control module, obtaining current navigation data and current aircraft status data; commanding a vertical situation display (VSD) and a lateral navigation display (ND) to render, concurrently, a viewing segment of a flight plan; receiving a user input selecting a section of the viewing segment, the user input being received on only one of the VSD and the ND; commanding, concurrently, the VSD and the ND to visually distinguish the section; demarking the section with a starting point and an ending point on the VSD; and for a flight parameter, (a) determining which display among the VSD and the ND is appropriate for the rendering of flight parameter information; (b) generating flight parameter information based on (a); and (c) overlaying the flight parameter information on the appropriate display.

In addition, a flight display system for an aircraft is provided. The flight display system comprising: a display system configured to render thereon a viewing segment defined as at least a portion of a flight plan for the aircraft, the viewing segment, when rendered, being concurrently presented on (i) a vertical situation display (VSD), and (ii) a lateral navigation display (ND); and a control module comprising a processor and a memory, the control module operationally coupled to the display device and configured to, receive a user input that selects a section of the viewing segment, the user input being received on a first display, the first display being one of the VSD and the ND; visually distinguish the section from the remaining portion of the viewing segment on the VSD and the ND; visually demark a starting point of the section and an ending point of the section on (i) an X axis and (ii) a Y axis, of the VSD; command the display system to render a graphical user interface element for prompting a user to selectively perform at least one action from the set including: add a flight parameter, and, delete a flight parameter; receive a user added first flight parameter; generate, for the first flight parameter, (a) an alphanumeric value at the starting point of the section, (b) a graphical representation of a rate of change between the starting point of the section and the ending point of the section, and (c) an alphanumeric value at the ending point of the section; command the display system to overlay, on the VSD, the flight parameter information; and concurrently update the VSD, the ND, and the flight parameters window, based on continuously obtaining current aircraft status data.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

Exemplary embodiments of the novel disclosed flight display system (FIG. 1, 102) provide a technologically improved flight display system and method that generates and displays multiple flight data (i.e., values for specific flight parameters) for a specific selected section of a flight plan on the VSD and ND. The disclosed flight display system 102 accepts a user selection on either the VSD or ND, and concurrently visually distinguishes and labels the selected section on both the VSD and the ND. The disclosed flight display system 102 can further provide for multiple selected flight parameters, any combination of: accurate values with respect to an X and a Y axis, value changes, and rates of change, along the selected section.

The enhancement provided by the disclosed flight display system 102 provides technologic effects, such as allowing a user to quickly view:

A lateral perspective/view of a portion of a descent leg which would be exceeding flight path angle limits. This might help Pilot to take appropriate action by knowing the predicted course for that selected portion on the VSD.

A vertical perspective/view of a specific portion of HOLD leg during Climb. This might help Pilot/Airlines to analyze and take any appropriate action if needed in transitioning to Cruise.

A predicted distance to a destination from a portion of curved path during Cruise. This might help in analyzing/modifying that specific portion if near to top of descent.

A ferry fuel tank fuel remaining value and the corresponding rate of fuel consumption. This might help Pilot to plan the landing fuel weight.

Figure 1:
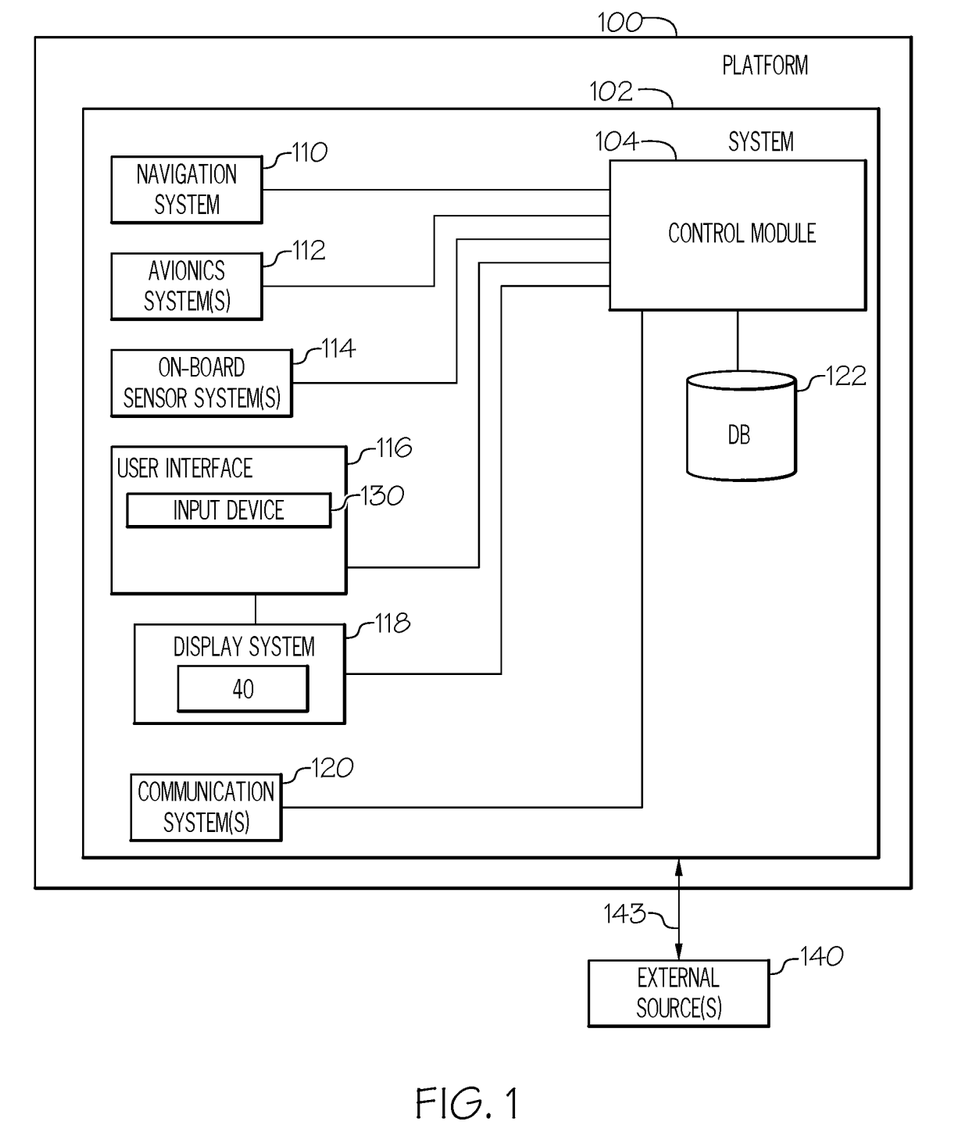
FIG. 1 is a block diagram of a flight display system, in accordance with an exemplary embodiment.

Turning now to FIG. 1, in an embodiment, the flight display system 102 (also referred to herein as "system" 102) is generally located in a mobile platform 100. In various embodiments, the mobile platform 100 is an aircraft, and is referred to as aircraft 100. The flight display system 102 embodies a control module 104. The control module 104 may be separate from, or integrated within, a preexisting mobile platform management system, avionics system, cockpit display system (CDS), flight controls system (FCS), aircraft flight management system (FMS), or electronic flight bag (EFB).

As an overview, the control module 104 performs the functions of identifying a user selected segment on a first display, concurrently visually distinguishing the user selected segment on the first and a second display, and providing flight parameter information associated with the selected segment. In order to perform these functions, the control module 104 may be operatively coupled to any combination of the following aircraft systems: a navigation system 110, one or more avionics systems 112, one or more on-board sensor systems 114, a user interface 116, a display system 118, a communications system 120, and one or more data storage elements (DB 1) 122. The functions of these aircraft systems, and their interaction, are described in more detail below.

Still referring to FIG. 1, in an exemplary embodiment, the control module 104 is coupled to the navigation system 110, which, as used herein, comprises a flight management system FMS and a flight plan database. As used herein, "current" is interchangeable with real-time and instantaneous. The navigation system 110 is configured to provide current navigational data and/or information regarding operation of the aircraft 100, including current flight guidance for aircraft 100. The navigation system 110 may be realized as including a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 110, as will be appreciated in the art. The navigation system 110 is capable of obtaining and/or determining the current position of the aircraft 100, that is, (i) the instantaneous location of the aircraft 100 (e.g., the latitude and longitude) and (ii) the instantaneous altitude (or above ground level) for the aircraft 100. The navigation system 110 is also capable of obtaining or otherwise determining the instantaneous heading of the aircraft 100 (i.e., the direction the aircraft is traveling in relative to some reference), and to compare the instantaneous position of the aircraft 100 with an intended flight plan for the aircraft 100. The various data, information, and guidance, determined by the navigation system 110, are referred to herein as navigation data or as current aircraft status data, and may comprise current phase of flight information. Navigation data is made available such that one or more of the other onboard systems 112, 114, 116, 118, 120, and the control module 104, may further process and/or handle the navigation data.

The avionics system(s) 112 include numerous systems for obtaining and/or providing current flight-related data and information. For example, avionics systems 112 may include any combination of: a weather system, an air traffic management system, a radar system, a traffic avoidance system, an autopilot system, an auto thrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. Each of these avionics systems 112 generates respective data; the entirety of data from the avionics system(s) 112 is referred to herein as avionics data. Current avionics data is made available such that one or more of the other onboard systems 110, 114, 116, 118, 120, and the control module 104, may further process and/or handle the avionics data.

In the illustrated embodiment, the onboard sensor system(s) 114 generally represent the component(s) of the aircraft 100 that sense, detect, or otherwise identify a respective status of various aircraft systems and subsystems. For example, the onboard sensor system(s) 114 may sense status of a specific avionics system 112, subsystem, surface, component, line replacement unit (LRU), or the like. In operation, the sensor system(s) 114 provides sensor data including real-time system status data to one or more of the other onboard systems 110, 112, 116, 118, 120. The sensor system(s) 114 also provide a respective status of objects or regions of interest in the vicinity of the aircraft 100. For example, an onboard sensor system 114 may be realized as a weather radar system or other weather sensing system that measures, senses, or otherwise detects meteorological conditions in the vicinity of the aircraft 100. The sensor data, therefore, comprises current data for aircraft systems, objects, and weather. The sensor system(s) 114 provides sensor data such that one or more of the other onboard systems 110, 112, 116, 118, 120, and control module 104 may further process and/or handle the sensor data.

The user interface may include a user input device 130. The user input device 130 is coupled to the control module 104, and the user input device 130 and the control module 104 are cooperatively configured to allow a user (e.g., a pilot, co-pilot, or crew member) to interact with the display devices in the display system 118 and/or other elements of the flight display system 102, as described in greater detail below. Depending on the embodiment, the user input device 130 may be realized as a keypad, touchpad, keyboard, mouse, touch panel (or touchscreen), joystick, knob, line select key or another suitable device adapted to receive input from a user. When the user input device 130 is configured as a touchpad or touchscreen, it may be integrated with the display system 118.

The control module 104 may be coupled to a communications system 120, which is configured to support communications between external source(s) 140 and the aircraft 100 via the communications link 143. External source(s) 140 may comprise air traffic control (ATC), neighboring aircraft, sources of weather information, and other suitable command centers and ground locations. Non-limiting examples of data received from the external source(s) 140 include, for example, instantaneous (i.e., real time or current) air traffic control (ATC) communications, traffic collision and avoidance system (TCAS) data from other aircraft, automatic dependent surveillance broadcast (ADS-B) data, and weather communications. In addition, an external data source 140 may be used to load or program a flight plan into the system 102 (generally, into a flight plan database in the navigation system 110). Accordingly, the communications system 120 and communications link 143 may include a data link system, automatic dependent surveillance broadcast system (ADS-B), a communication management function (CMF) uplink, a terminal wireless local area network (LAN) unit (TWLU), or any other suitable radio communication system that supports communications between the aircraft 100 and the various external source(s) 140. In this regard, the communications system 120 may allow the aircraft 100 to receive information that would otherwise be unavailable to the pilot and/or co-pilot using the onboard systems 110, 112, 114, 116.

In various embodiments, any combination of the navigation system 110, avionics system(s) 112, onboard sensor system(s) 114, and communications system 120, may be coupled to the display system 118 such that the display system 118 may generate or render, on a display device, real-time information associated with the respective components. Coupled in this manner, the navigation system 110, avionics system(s) 112, onboard sensor system(s) 114, and communications system 120 are configured to support navigation, flight planning, and other aircraft control functions in a conventional manner, as well as to provide real-time data and/or information regarding the operational status of the aircraft 100 to the control module 104.

The renderings of the display system 118 may be processed by a graphics system, components of which may be integrated into the display system 118 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various techniques for visually distinguishing objects. The control module 104 is said to display various images herein. In practice, this may mean that the control module 104 generates display commands, and responsive to receiving the display commands from the control module 104, the display system 118 displays, renders, or otherwise visually conveys on a display device, one or more graphical representations or images associated with operation of the aircraft 100, and specifically, the multi-function display (MFD) 40 described in greater detail below.

In exemplary embodiments, the MFD 40 is realized on one or more electronic display devices configured as a combination of a vertical situation display (VSD) and a lateral navigation display (ND). The VSD renders a graphical representation of the aircraft 100 and one or more of the airspace, air traffic, navigational reference points, and a vertical flight plan associated with a flight plan of the aircraft 100. The ND renders a top down graphical representation of the aircraft 100 and one or more of the terrain, meteorological conditions, airspace, air traffic, navigational reference points, and a route associated with a lateral flight plan of the aircraft 100. Each of the VSD and ND are responsive to display commands from the control module 104 and/or display system 118. In this regard, the control module 104 and the display system 118 are cooperatively configured to generate the display commands for the MFD 40, including the various user interface elements, such as menus and buttons, described below.

The data storage element or database DB 122 may maintain information regarding terrain and airports and/or other potential landing locations (or destinations) for the aircraft 100. In this regard, the DB 122 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the DB 122 also maintains airport status data for the runways and/or taxi paths at the airport indicating whether or not a particular runway and/or taxi path is currently operational along with directional information for the taxi paths (or portions thereof).

As mentioned, the control module 104 performs the functions of the system 102. As used herein, the term "module" refers to any hardware, software, firmware, electronic control component, processing logic, and/or processor device, individually or in any combination, configured as a means for facilitating communications and/or interaction between the elements of the flight display system 102 and performing additional processes, tasks and/or functions to support operation of the flight display system 102, as described herein. Depending on the embodiment, the control module (FIG. 1, 104) may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Figure 2:
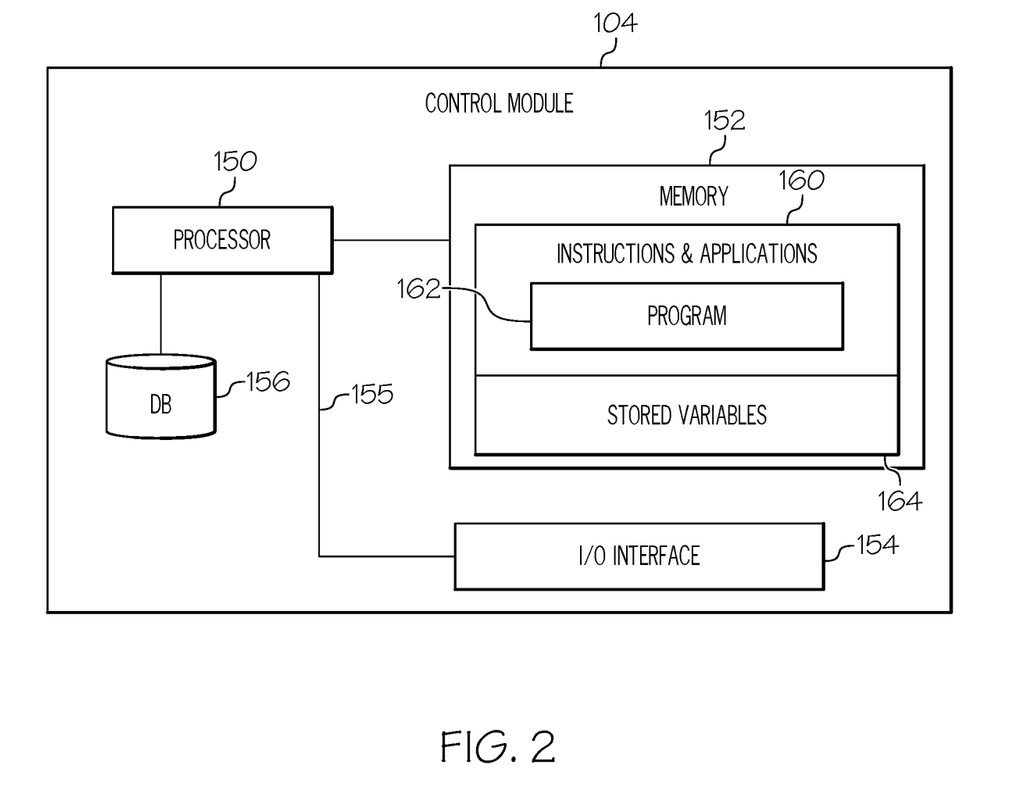
FIG. 2 is a block diagram of a control module for a flight display system, in accordance with an exemplary embodiment.

In an embodiment of the control module 104, depicted in FIG. 2, a processor 150 and a memory 152 form a novel processing engine or unit that performs the processing activities of the system 102. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 maintains data bits and may be utilized by the processor 150 as storage and/or a scratch pad. The memory 152 may be located on and/or co-located on the same computer chip as the processor 150. In the depicted embodiment, the memory 152 stores instructions and applications 160 and one or more configurable variables in stored variables 164. Information in the memory 152 may be organized and/or imported from an external data source 140 during an initialization step of a process; it may also be programmed via a user input device 130.

A novel program 162 is embodied in the memory 152 (e.g., RAM memory, ROM memory, flash memory, registers, a hard disk, or the like) or another suitable non-transitory short or long term storage media capable of storing computer-executable programming instructions or other data for execution. The program 162 includes rules and instructions which, when executed, cause the flight display system 102 to perform the functions, techniques, and processing tasks associated with the operation of the flight display system 102 described herein.

During operation, the processor 150 loads and executes one or more programs, algorithms and rules embodied as instructions and applications 160 contained within the memory 152 and, as such, controls the general operation of the control module 104 as well as the system 102. In executing the process described herein, the processor 150 specifically loads and executes the instructions embodied in the program 162. Additionally, the processor 150 is configured to, in accordance with the program 162: process received inputs (selectively, any combination of input from the set including: external data sources 140, the navigation system 110, avionics system(s) 112, on-board sensor system(s) 114, the user interface 116, the display system 118, and the communications system 120); reference any of the databases; determine various flight parameters; and, generate display commands that command and control the display system 118.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables communications between the control module 104 and other system 102 components, as well as with other external data sources 140 not already addressed herein, and as well as within the control module 104, can include one or more network interfaces to communicate with other systems or components. The I/O interface 154 can be implemented using any suitable method and apparatus. For example, the I/O interface 154 supports communication from a system driver and/or another computer system. In one embodiment, the I/O interface 154 obtains data from external data source(s) 140 directly. The I/O interface 154 may also include one or more network interfaces to communicate with technicians, and/or one or more storage interfaces for direct connection to storage apparatuses, such as the database 156.

The database 156 may include an aircraft-specific parameters database (comprising aircraft-specific parameters for a variety of aircrafts) and parameters and instructions for processing user inputs and rendering images on the MFD 40, as described herein. In some embodiments, the database 156 is part of the memory 152. In various embodiments, the database 156 and the database 122 are integrated, either within the control module 104 or external to the control module 104.

Figure 3:
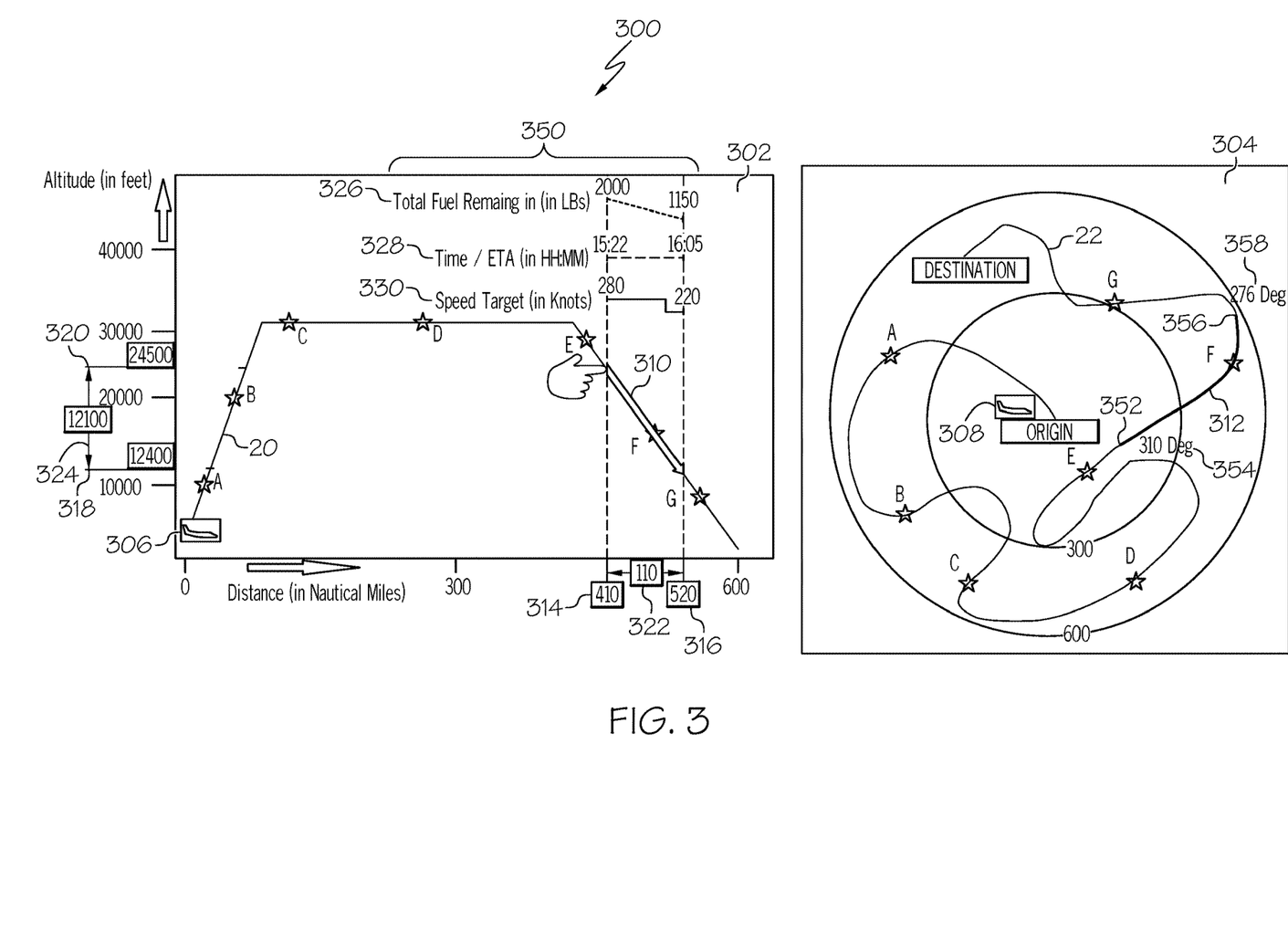
FIGS. 3-5 are multi-function display (MFD) images, in accordance with exemplary embodiments.

The images displayed on the MFD 40 (including the VSD and the ND) are understood to be based on current aircraft status data for the aircraft 100 and to be dynamically updated based on continuously obtaining the current aircraft status data. As used herein, a "viewing segment" is at least a portion of a flight plan for the aircraft 100; each MFD 40 image depicts the same viewing segment on each of the VSD and ND. FIG. 3 depicts a MFD image 300 that may be generated in accordance with various embodiments. MFD image 300 includes viewing segment 20 rendered on the VSD 302 image and viewing segment 22 rendered on the ND 304 image, wherein viewing segment 20 and viewing segment 22 each provide different views of the same portion of the flight plan (in this example, the entire flight plan from origin to destination). Aircraft 100 is depicted on each of the VSD 302 (at 306) and ND 304 (at 308) to provide reference for the respective viewing segment.

User input, for example, selecting a section of a viewing segment, may be received in association with either of the VSD 302 or ND 304; therefore, the VSD 302 and the ND 304 are each referred to as a "display," and the user input is described herein as being received on (or in association with) either of the displays. Responsive to a user input selecting a section on a first display, the control module 104 determines the corresponding section on the second display, and concurrently visibly distinguishes the user selection on each display. To illustrate this concept, FIG. 3 depicts a user input on the VSD 302, selecting a section 310 of the viewing segment. In the example, section 310 is a portion of the viewing segment in which the aircraft is to be descending toward its destination. Responsive to the user selection of section 310, the control module 104 determines the corresponding section on the second display, which is section 312, and concurrently visually distinguishes the section 310 from the remaining portion of the viewing segment on the VSD 302 and the section 312 from the remaining portion of the viewing segment on the ND 304. Techniques for visually distinguishing sections may include highlighting, changing line widths, changing colors, and the like.

Regardless of which display the user input is received on, the control module 104 also, responsive thereto, visually demarks, with an alphanumeric value, a starting point of the section 310 and an ending point of the section 310; these points are, respectively, (i) an X axis (314, 316) and (ii) a Y axis (320, 18), of the VSD 302. In various embodiments, control module 104 also determines and displays a delta distance 322 (316-314) and a delta altitude 324 (320-318), along the respective axis, on the VSD 302. For example, in FIG. 3, the delta distance 322 is 110 nautical miles, and the delta altitude is 12,100 feet.

In various embodiments, in addition to displaying the selected sections (310 312), the control module 104 generates and displays selected flight parameter information associated with the selected sections (310 312). Flight parameter information may include (1) a predicted change in the flight parameter value from the starting point to the ending point, and/or (2) a rate of change of the flight parameter from the starting point to the ending point. Any combination of the below flight parameters may be selected. The below table presents a non limiting example of flight parameters that the user may select for display.

TABLE 1

Flight Parameters

Calibrated Air Speed (in Knots)
Total Fuel Remaining (in LBS)
Gross weight (in LBs)
Time/ETA (in HH:MM)
Fuel weight (in LBS)
Mach
Speed Target (in Knots)
Fuel Flow (in LBS/Hour)
Flight Path Angle (In Degrees)
Drag (in Newton)
Lift (in Newton)
Minimum Calibrated Air Speed (in Knots)
Maximum Calibrated Air Speed (in Knots)
Speed Brake Position
ISA Deviation (in Deg Celsius)
Minimum envelope Altitude (in Feet)
Maximum Envelope Altitude (in Feet)
Wind (in Knots)
Ferry Fuel Tank Fuel Quantity (in LBS)
Current Temperature (in Deg Celsius)

With continued reference to FIG. 3, the selected flight parameters are: total fuel remaining 326, time/estimated time of arrival (ETA) 328, and a speed target (in Knots) 330. Responsive to the user selection of a section (310, 312), the control module 104 processes each selected flight parameter with the novel rules embedded in the program 162, and user selections, to determine whether to generate flight parameter information comprising a rate of change or values along the section (310, 312), and then generates the flight parameter information for the selected flight parameter. With respect to the VSD 302, the control module 104 provides the generated flight parameter information in a flight parameters window 350. The flight parameter window 350 includes, for each selected flight parameter, an alphanumeric label, and a graphical representation of the rate of change or values along the selected section, for each of the selected flight parameters. Flight parameters window 350 is overlaid on the VSD 302 such that it is near the viewing segment 20, but not obscuring the viewing segment. The control module 104 aligns the flight parameter window 350 and its information with the selected section 310 on the X axis (as can be seen in FIG. 3, the graphical representations of the values of each of the flight parameters are aligned to begin at the starting point 314 of the section 310 and end at the ending point 316 of the section 310). During operation, the control module 104 continually (i) commands the display system 118 to overlay, on the VSD 302, the flight parameters window 350; (ii) obtains current aircraft status data for the aircraft 100; and (iii) dynamically updates the VSD 302, the ND 304, and the flight parameters window 350 based on continuously obtaining the current aircraft status data for the aircraft 100.

In various embodiments, values for one or more flight parameters along the selected section 312 are also determined by the control module 104 and displayed, alphanumerically, on the ND 304. For example, in FIG. 3, the starting point is 352, having associated therewith an alphanumeric value for a banking angle 354 (310 degrees), and the ending point is 356, having associated therewith a banking angle 358 (276 degrees). Other parameters that may be displayed or overlaid on the ND 304 include the course of the wind at the starting point 352 and at the ending point 356.

Figure 4:
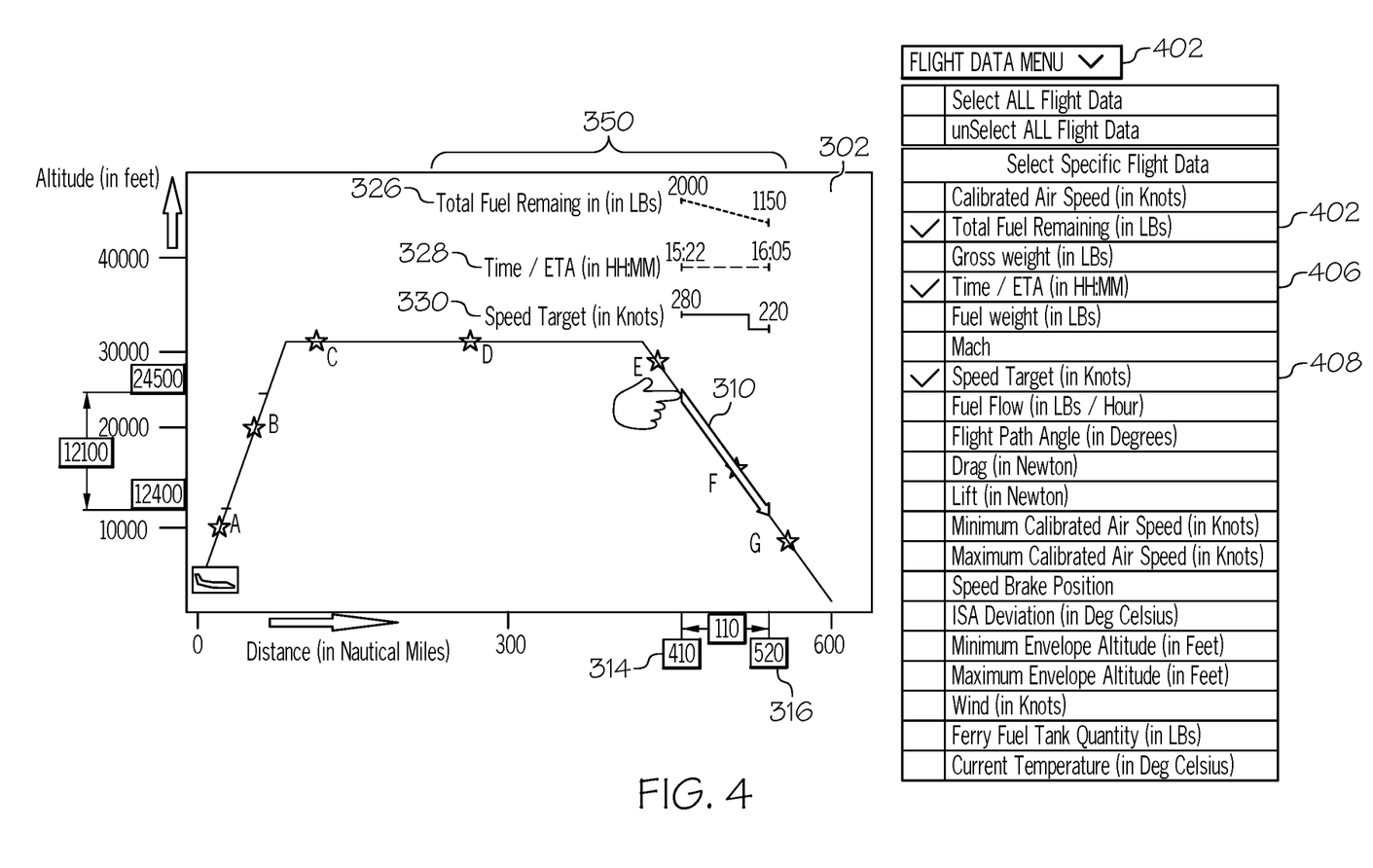

The flight parameters selected for display on the VSD 302 or ND 304 may be selected in a variety of ways. In various embodiments, a user interface element (such as a menu, buttons, or the like) is used for prompting a user to perform an action such as to add or delete a flight parameter. In some embodiments, for example, as shown in FIG. 4, the control module 104 generates and displays a flight data menu 402 on the MFD 40. The user views the flight data menu 402, and selects or adds (for display) or deselects or deletes (to remove from display) one or more flight parameters. The control module processes the user selection and dynamically updates the images on the MFD 40 responsive thereto. In FIG. 4, total fuel remaining 404, time/ETA 406 and speed target 408 is shown selected. In the flight parameters window 350, (1) the total fuel remaining is shown as a generally linear rate of change from 2000 to 1150 pounds along the section 310 at 326 (2) the Time/ETA is shown at 328 with a lateral dashed line connecting 15:22 and 16:05, and (3) the speed target in Knots is shown at 330 as 280 at the starting point 314, the rate of change shown as dropping to 220 at some point prior to the ending point 316.

Figure 5:
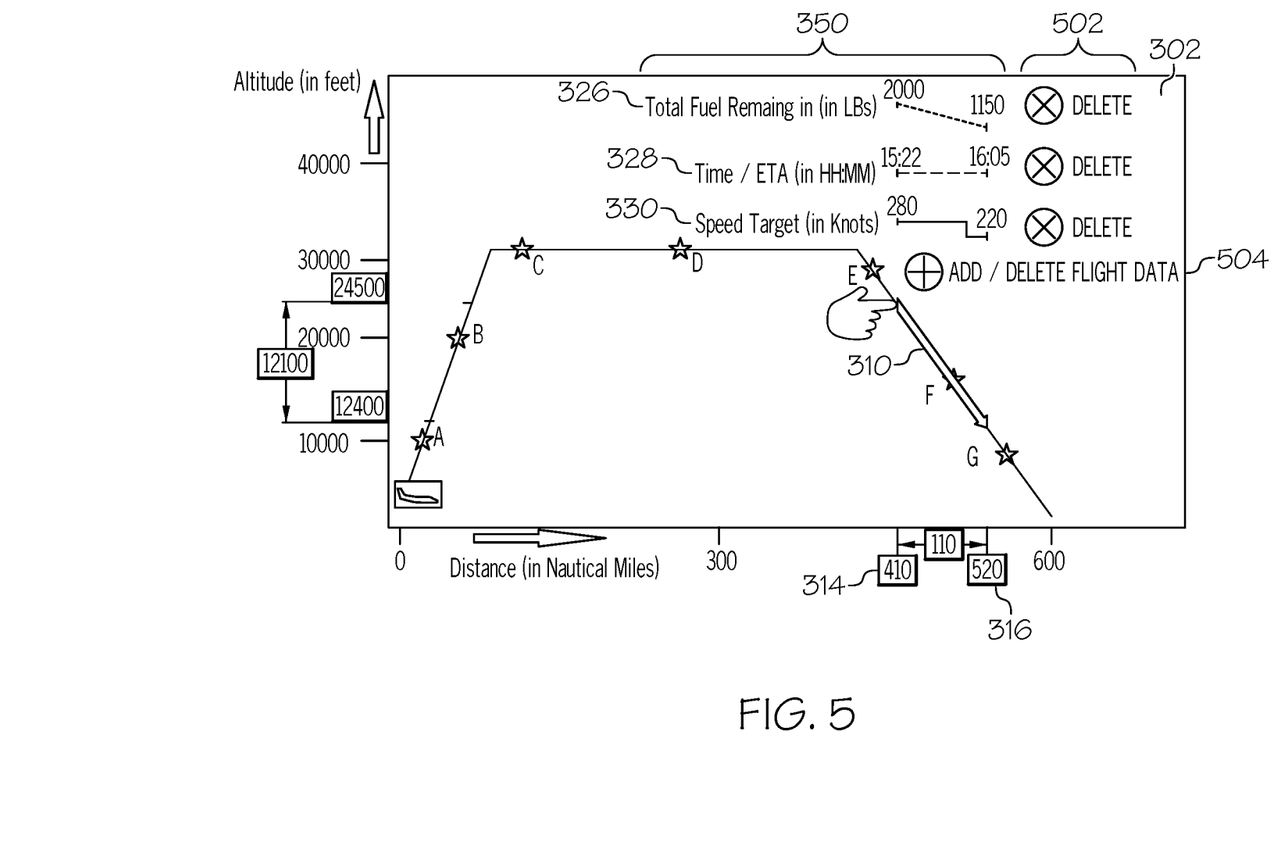

In other embodiments, for example, as shown in FIG. 5, the control module 104 generates and displays buttons 502, 504, to individually add and delete flight parameters on the MFD 40. Buttons 502 are shown aligned laterally, one per displayed flight parameter (326, 328, 330), allowing a user to delete the respective flight parameter (326, 328, 330). Button 504 allows the user to selectively choose additional flight parameters to display in the flight parameters window 350. Accordingly, with reference to FIGS. 4 and 5, a graphical user interface element is displayed and used for prompting a user to perform at least one action from the set including, (i) add a flight parameter to the flight parameters window, and (ii) delete a flight parameter from the flight parameters window.

Further, and as mentioned, some of the selected flight parameters may be displayed on the ND 304. The program 162 comprises rules determining whether to render a flight parameter on the VSD 302 or the ND 304. The rules take into account the display area of the ND 304 and the nature of the flight parameter; based thereon, the control module 104 processes each user selected flight parameter and determines whether to render it on the VSD 302 or the ND 304. As shown in FIG. 3, flight parameters determined to be displayed on the ND 304 are overlaid on the ND 304 such that it is near the viewing segment 22, but not obscuring the viewing segment.

Figure 6:
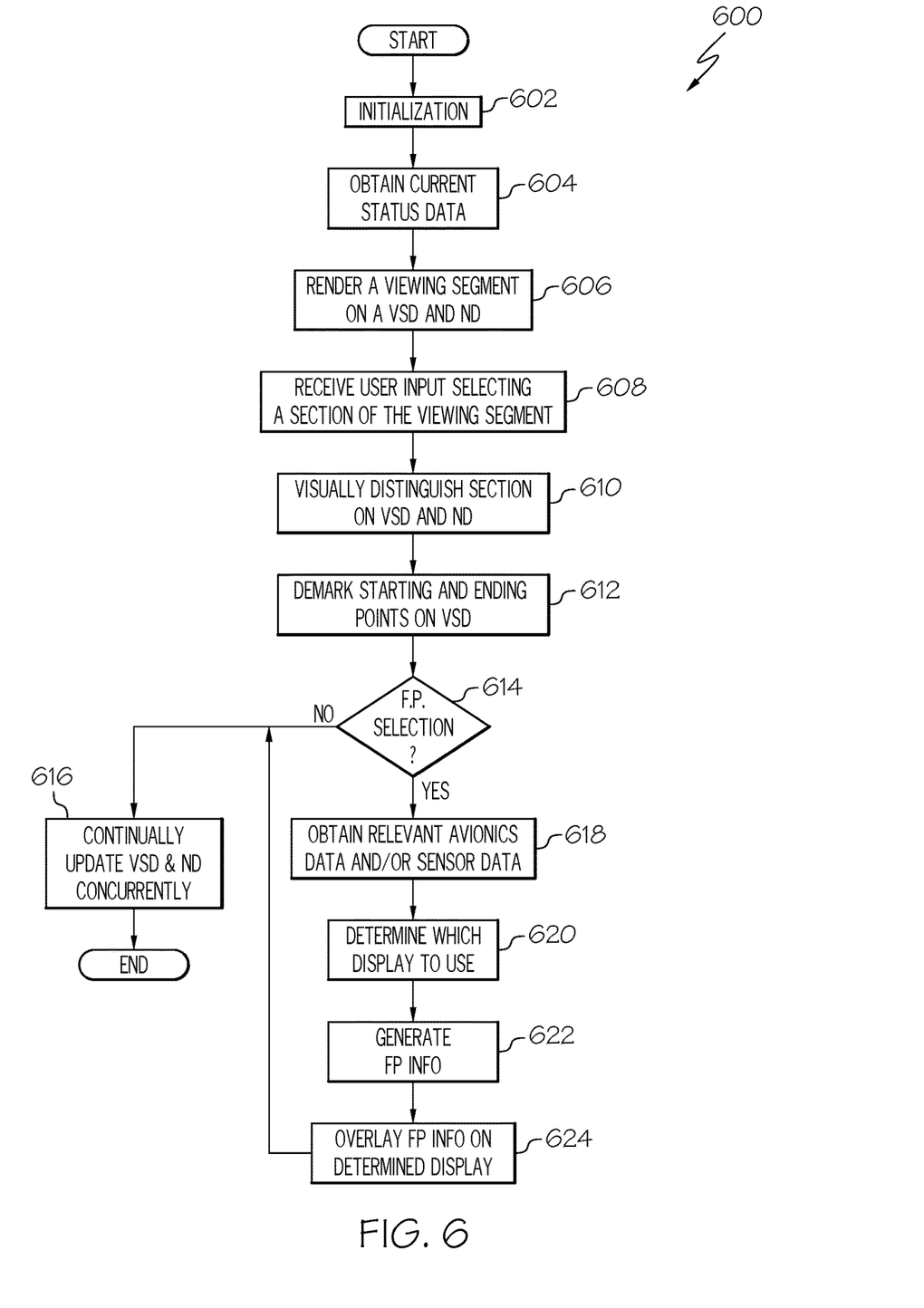
FIG. 6 is a flow chart for a method for flight display system, in accordance with an exemplary embodiment.

As mentioned, the flight display system 102 may be used to implement a method 600, as shown in the flow chart of FIG. 6. For illustrative purposes, the following description of method 600 may refer to elements mentioned above in connection with FIGS. 1-2. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

The method starts, and at 602 the flight display system 102 is initialized. Initialization generally comprises uploading or updating instructions and applications as required for operation of the flight display system 102. This may include: the executable program 162; the DB 122; and, any associated stored variables 164. At 604, the control module 104 receives current aircraft status data for the aircraft 100.

At 606, responsive to processing current aircraft status data, a viewing segment is rendered on MFD 40. The viewing segment is rendered as a vertical view in VSD 302 and as a lateral view, as ND 304. At 606 the method 600 identifies a user input that selects a section of the viewing segment. As mentioned above, the user input is received on a first display, the first display being one of the VSD 302 and the ND 304. At 610, the section is visually distinguished from the remaining portion of the viewing segment on the VSD 302 and the ND 304; this is regardless of which display the user input is received from. At 612, a starting point of the section 310 and an ending point of the section 310 are visually demarked on (i) an X axis and (ii) a Y axis, of the VSD 302. At 612, the method 600 may also determine and display a delta distance 322 (316-314) and a delta altitude 324 (320-318), along the respective axis, on the VSD 302.

In embodiments in which there are no flight parameters (FP) selected at 614, the method 600 proceeds to 616 to continually update the VSD 302 and the ND 304 during aircraft operation or until receiving another user input at 608. As may be appreciated, in response to receiving a second user input selecting a section at 608, the method 600 removes or deletes any visual distinctions or parameter selections from the previous user selection.

In embodiments in which a flight parameter (FP) is selected for display, at 614, the method 600 proceeds to 618 to obtain the relevant avionics data and/or sensor data. At 620, the method 600 determines which display is appropriate for the display of the selected FP information; this determination may be based on display dimensions and the nature of the FP (i.e., some flight parameters naturally lend themselves to a vertical display and others to a lateral display). At 622 the FP information is generated based on the relevant avionics data and/or sensor data, and the determined appropriate display. The FP information for display on the VSD 302 includes: the flight parameters window 350 is generated based on the starting point 314 of the section 310 and the ending point 316 of the section 310, the flight parameters window 350 including, for a flight parameter, (a) a respective alphanumeric value at the starting point 314 of the section 310, (b) a graphical representation of a rate of change (or values) between the starting point 314 of the section 310 and the ending point 316 of the section 310, and (c) an alphanumeric value at the ending point 316 of the section 310. The FP information for display on the ND 304 includes (a) a respective alphanumeric value at the starting point 352 of the section 312, and (c) an alphanumeric value at the ending point 316 of the section 310. At 624, the FP information generated at 622 is overlaid on the respective display (i.e., the VSD 302 or the ND 304) as described herein.

As mentioned, a user may interact with the flight display system 102 and add (i.e., select additional) FPs, or delete FPs. When there are a plurality of FPs selected, the method 600 repeats 618, 620, and 622 for each FP, accumulating each of the generated FP information in memory 152. At 624, when there is a plurality of FPs selected, and/or a FP for each display, all of the FP information is concurrently overlaid on the display(s). Specifically, at 624, the control module commands the display system 118 to overlay, on the respective display, the FP information. Multiple FPs are displayed on the VSD 302 such that each is aligned within the FP window 350 as described herein. Subsequent to overlaying the FP information on the respective display at 624, the method 600 proceeds to 616 to continually update the VSD 302 and the ND 304 during aircraft operation or until receiving another user input at 608.

Accordingly, the exemplary embodiments discussed above provide a technologically improved flight display system 102 and method that generates multiple flight data for a specific selected section of a flight plan on the VSD and ND. The disclosed flight display system 102 accepts a user selection on either the VSD or ND, and concurrently visually distinguishes and labels the selected section on both the VSD and the ND. The disclosed flight display system 102 allows a user to select desired flight parameters to display, and displays, for each selected parameter, any combination of: accurate values with respect to an X and a Y axis, value changes, and rates of change, along the selected section.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight display system for an aircraft, comprising:
   a display system configured to render thereon a viewing segment defined as at least a portion of a flight plan for the aircraft, the viewing segment, when rendered, being concurrently presented on (i) a vertical situation display (VSD), and (ii) a lateral navigation display (ND); and
   a control module comprising a processor and a memory, the control module operationally coupled to the display system and configured to,
      receive a user input that selects a section of the viewing segment, the user input being received on a first display, the first display being one of the VSD and the ND;

concurrently visually distinguish the section from the remaining portion of the viewing segment on the VSD and the ND;

visually demark a starting point of the section and an ending point of the section on (i) an X axis and (ii) a Y axis, of the VSD;

generate a flight parameters window based on the starting point of the section and the ending point of the section, the flight parameters window including, for a first user-selected flight parameter: an alphanumeric value at the starting point of the section, a graphical representation of a rate of change between the starting point of the section and the ending point of the section, and an alphanumeric value at the ending point of the section;

command the display system to overlay, on the VSD, the flight parameters window;

command the display system to render a graphical user interface element on the VSD for prompting a user to selectively perform at least one action from the set including, (i) add a flight parameter, and (ii) delete a flight parameter;

receive a user added second flight parameter responsive to the rendered graphical user interface element;

determine which display from among the VSD and the ND is appropriate for display of flight parameter information for the second flight parameter;

generate the flight parameter information for the second flight parameter;

overlay the second flight parameter information on the appropriate display;

obtain current aircraft status data; and concurrently update the VSD, the ND, and the flight parameters window based on continuously obtaining the current status information for the aircraft.

2. The flight display system of claim 1, wherein the first user-selected flight parameter and second user-selected flight parameter are two of a plurality of user-selected flight parameters, and wherein the control module is further configured to:

generate the flight parameters window such that it includes, for each user-selected flight parameter of the plurality of user-selected flight parameters:

an alphanumeric value at the starting point of the section, a graphical representation of a rate of change between the starting point of the section and the ending point of the section, and an alphanumeric value at the ending point of the section.

3. The flight display system of claim 1, wherein the first user-selected flight parameter and second user-selected flight parameter are two of a plurality of user-selected flight parameters, and wherein the control module is further configured to:

for each user-selected flight parameter of the plurality of flight parameters,
(a) determine which display, from among the VSD and ND, is appropriate for the display of flight parameter information for the user-selected flight parameter;
(b) generate flight parameter information based on (a);
(c) overlay the flight parameter information on the appropriate display.

4. The flight display system of claim 3, wherein the control module is configured to determine which display from among the VSD and ND is appropriate based on one or more of: display dimensions, avionics data, and sensor data.

5. The flight display system of claim 2, wherein the control module is further configured to:
receive a user deleted flight parameter; and
delete, from the flight parameters window, flight parameter information associated with the user deleted flight parameter.

6. The flight display system of claim 3, wherein the control module is further configured to:
receive a user deleted flight parameter; and
delete flight parameter information associated with the user deleted flight parameter from the appropriate display.

7. A method for a flight display system, comprising:
at a control module,
obtaining current navigation data and current aircraft status data;
commanding a vertical situation display (VSD) and a lateral navigation display (ND) to render, concurrently, a viewing segment of a flight plan;
receiving a user input selecting a section of the displayed viewing segment, the user input being received on only one of the VSD and the ND;
commanding the VSD and the ND to concurrently visually distinguish the section;
demarking the section with a starting point and an ending point on (i) an X axis and (ii) a Y axis, on the VSD; and
for a first user prescribed flight parameter,
(a) determining which display among the VSD and the ND is appropriate for the rendering of flight parameter information for the first user prescribed flight parameter;
(b) generating the flight parameter information based on (a) the flight parameter information including an alphanumeric value at the starting point of the section, a graphical representation of a rate of change between the starting point of the section and the ending point of the section, and an alphanumeric value at the ending point of the section; and
(c) overlaying on the appropriate display a flight parameters window based on the starting point of the section and the ending point of the section, the flight parameters window including the flight parameter information for the first flight parameter;
(d) concurrently updating the VSD, the ND, and the flight parameters window based on continuously obtaining the current aircraft status data; and
(e) commanding the display system to render a graphical user interface element on the VSD for prompting a user to selectively perform at least one action from the set including, (i) add a flight parameter, and (ii) delete a flight parameter; and
receiving a user added second flight parameter responsive to the rendered graphical user interface element;
determining which display is appropriate for the display of second flight parameter information for the second flight parameter;
generating flight parameter information for the second flight parameter; and
overlaying the flight parameter information for the second flight parameter on the display determined appropriate for the display of second flight parameter information.

8. The method of claim 7, wherein the first user prescribed flight parameter and second user prescribed flight parameter are two of a plurality of user prescribed flight parameters, and further comprising, for each flight parameter of the plurality of user prescribed flight parameters, repeating (a)-(e).

9. The method of claim 7, further comprising:
receiving a user deleted flight parameter, and, for the deleted flight parameter,
deleting flight parameter information associated with the user deleted flight parameter from the appropriate display.

10. A flight display system for an aircraft, comprising:
a display system configured to render thereon a viewing segment defined as at least a portion of a flight plan for the aircraft, the viewing segment, when rendered, being concurrently presented on (i) a vertical situation display (VSD), and (ii) a lateral navigation display (ND); and
a control module comprising a processor and a memory, the control module operationally coupled to the display system and configured to,
receive a user input that selects a section of the viewing segment, the user input being received on a first display, the first display being one of the VSD and the ND;
concurrently visually distinguish the section from the remaining portion of the viewing segment on the VSD and the ND;
visually demark a starting point of the section and an ending point of the section on (i) an X axis and (ii) a Y axis, of the VSD;
command the display system to render a graphical user interface element on the VSD for prompting a user to selectively perform at least one action from the set including: add a flight parameter, and, delete a flight parameter;
receive a user added first flight parameter responsive to the rendered graphical user interface element;
generate, for the user added first flight parameter, flight parameter information including (a) an alphanumeric value at the starting point of the section, (b) a graphical representation of a rate of change between the starting point of the section and the ending point of the section, and (c) an alphanumeric value at the ending point of the section;
command the display system to overlay, on the VSD, the flight parameter information for the user added first flight parameter in a flight parameters window; and
concurrently update the VSD, the ND, and the flight parameters window, based on continuously obtaining current aircraft status data;
receive a user added second flight parameter responsive to the rendered graphical user interface element;
determine which display from among the VSD and the ND is appropriate for display of flight parameter information for the second flight parameter;
generate flight parameter information for the second flight parameter;
overlay the flight parameter information for the second flight parameter on the appropriate display.

11. The flight display system of claim 10, wherein the control module is further configured to determine which display is appropriate based on one or more of: display dimensions, avionics data, and sensor data.

12. The flight display system of claim 10, wherein the control module is further configured to:
receive a user deleted flight parameter; and
delete, from the flight parameters window, flight parameter information associated with the user deleted flight parameter.

* * * * *